July 17, 1934.    J. J. FINGLAND ET AL    1,967,053
METHOD OF REFINING LEAD BISMUTH ALLOY
Filed Aug. 20, 1931
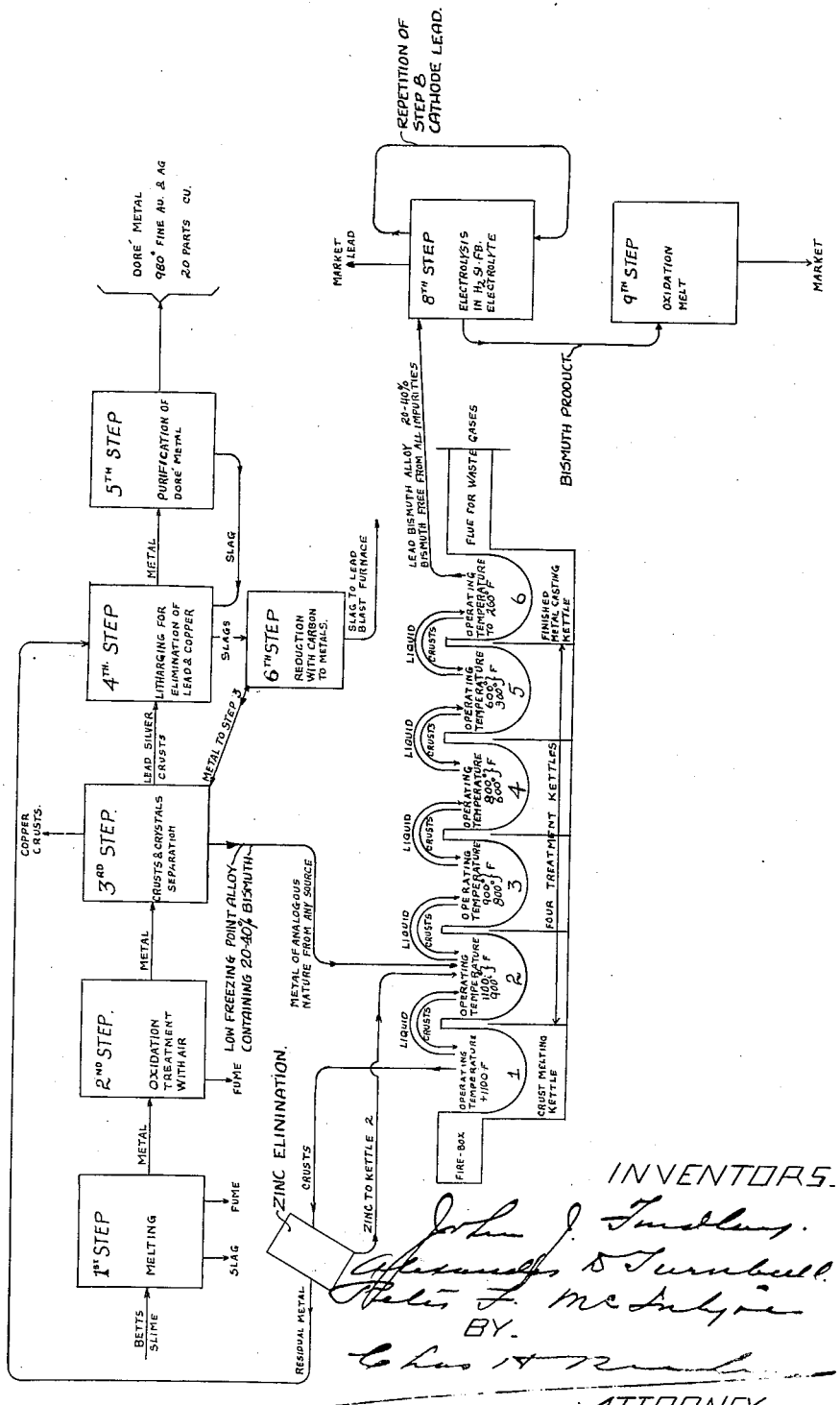

Patented July 17, 1934

1,967,053

UNITED STATES PATENT OFFICE 1,967,053

METHOD OF REFINING LEAD BISMUTH ALLOY

John James Fingland, Alexander Douglas Turnbull, and Peter Findlay McIntyre, Trail, British Columbia, Canada, assignors to The Consolidated Mining and Smelting Company of Canada, Limited, Montreal, Quebec, Canada, a company of Canada Application August 20, 1931, Serial No. 558,284

7 Claims. (Cl. 204—57)

The slime product resulting from the Betts process of electrolytic refining lead bullion contains gold, silver, some of the lead and the major proportion of the several metals which may be present as impurities in the bullion being refined, and this slime product is ordinarily treated for the recovery of the contained gold and silver by fire methods of refining comprising the following steps:

(1) The initial melt.
(2) Oxidation treatment of the melt for elimination of readily oxidizable metals as fume.
(3) Crusts and crystals separations.
(4) Litharging treatment for the elimination of copper, bismuth and lead, as oxide slag.
(5) Purification of the residual gold and silver alloy with nitre preparatory to the separation of each from the other by electrolytic or chemical methods of parting.
(6) Reduction with carbon to metal.
(7) Series of graduated coolings for the recovery of a low freezing point lead-bismuth alloy obtained by step 3.
(8) Electrolysis of the lead bismuth alloy for the electrolytic recovery of marketable lead.
(9) Oxidizing melt for the recovery of marketable bismuth.

In step No. 3 is indicated the method described by us in Letters Patent No. 1,801,339, dated April 21, 1931, by which the production of the slag may be minimized by submitting the metal to a series of cooling and crust formations which after elimination of the crust leaves a residual low freezing point lead bismuth alloy containing 20–40% bismuth substantially free from all other metals present as impurities.

In step 7 is indicated the method described by us in our application Serial No. 361,834, filed May 9, 1929, by which the remaining impurities, together with the gold and silver content of the original slime treated, pass directly to the separated crusts and are recovered at one end of the operation and the lead bismuth alloy is recovered at the other end. Instead of introducing step 3 after the completion of step 2, it may be delayed till the conclusion of step 4, in which case the slags are admixed with excess of carbonaceous matter as in step 6, and reduced in a reverberatory furnace to metal which is subjected to the series of cooling and crust formation steps as outlined in the patent referred to in step 3, leaving a residue of low freezing point lead bismuth alloy containing 20–40% bismuth as before. The present invention indicated in steps 7, 8 and 9 has for its object the continued treatment of this low freezing point lead bismuth alloy containing 20–40% bismuth from either of the above indicated alternative methods of preparation or the separate treatment of alloys originating from any source but possessing an analogous nature to the Betts slime product above indicated or to intermediates derived therefrom in the ordinary process of treatment. This continued treatment embodies the separation of a low melting point lead bismuth alloy containing 20–40% bismuth into marketable bismuth coincident with the recovery of the contained lead in marketable form.

The elimination of impurities, together with any gold and silver present, from lead bullion by the addition of zinc to the liquid bath of metal and the subsequent elimination of zinc crusts is established in the Parkes process. The analogous treatment of bismuth metal is also well established. In each of these processes of treatment there is a residual proportion of added zinc which remains in the final bath of metal alloyed with the lead. This introduced impurity has not only to be eliminated by a subsequent separate treatment before the lead can be rendered marketable but as this proportion of zinc has alloyed with it some gold and silver as in the crusts, there invariably remains small proportions of these metals in the final product which can only be partially eliminated by a repetition of the Parkes procedure.

The first step in the manufacture of marketable bismuth from the low freezing point lead bismuth alloy containing 20–40% bismuth comprises the complete elimination of all impurities including residual gold and silver which may be present in the alloy to be treated. This elimination, as described in our said application Serial No. 361,834 is effected by incorporating zinc in the crude charge, passing the latter through a series of separate thermal stages of progressively descending temperatures graduated from 1100° F. to 260° F.; maintaining at each stage a uniform temperature throughout the charge, passing the solidifying metals and impurities from each stage to the next higher stage of the series and the residual liquid from each stage to the next lower stage of the series; and recovering, at the final stage at one end of the operation, a low freezing lead-bismuth alloy substantially free from the other metals and impurities with which it was associated at the commencement of the operation, and at the final stage at the other end of the operation a crust containing said other metals and impurities. This crust elimination carries all metal impurities present including gold and silver and the zinc added away from the residual liquid metal bath, thus freeing this material from any impurities which may interfere with the final purity of the lead-bismuth product resulting therefrom and accomplishes this refining treatment in one step as against two essential for the refining of lead bullion by the Parkes process. The residual metal at 260° F. is cast into anodes which are electrolyzed for its separation into cathode lead, and a bismuth product, which after washing, drying and melting in an oxidizing atmosphere gives marketable metal.

The electrolysis may be effected in an electrolyte containing 6% hydrofluosilic acid ($H_2SiF_6$) and 13% lead fluosilicate ($PbSiF_6$) with a current density of 15 amperes per square foot. The purified lead bismuth alloy is cast into anodes usually about ¼″ by ⅜″ thick and the corrosion time should be limited to 36 hours to prevent excessive polarization at the anodes and the subsequent passage of bismuth to the cathodes. It may be advisable in some circumstances to operate at higher current densities, say 20 amperes per square foot and re-electrolyze the cathode lead a second time at 12–15 amperes per square foot to ensure a lead product of marketable quality. The bismuth slime product from either or both sources is washed with successive quantities of boiling water dried and submitted to an oxidation melt for the recovery of marketable bismuth. This electrolytic step is indicated in the drawing as step 8, and the subsequent melt to marketable bismuth as step 9.

A suitable plant for carrying out the process, as shown diagrammatically in the accompanying drawing, may consist of a battery of six five ton kettles, at one end of which is a firebox for providing the necessary heat with provision for conducting the gaseous products of combustion around each kettle in succession and thence to the stack; the heating arrangements being sufficient to maintain a temperature above 1100° F. in the first kettle and a temperature of about 260° F. in the last kettle of the series, and the actual procedure is carried out substantially as detailed below. Provision may be made to bypass the gaseous products from certain kettles and also to apply auxiliary heat by means of oil burners.

In the specific performance of the method according to this invention the charge of the crude lead bismuth alloy is heated uniformly throughout in a fusing vessel to a temperature materially above its fusion point. This temperature is about 1100° F. in the second kettle and at this stage from 1½% to 3% zinc is added to the molten charge which is agitated with a mechanical stirrer at that temperature. The successive crusts of the second kettle are transferred to and accumulated in the first kettle until it contains a full charge from a number of like operations. The charge in the first kettle is remelted and stirred at a temperature above 1100° F. and the crusts are removed from it and separately treated for the recovery of their valuable constituents and the added zinc. The recovered zinc and any liquid metal are returned from the first kettle to the second kettle as part of the zinc necessary for a new charge while the residue containing the gold, silver and other impurities is returned to the 2nd, or 4th, step in the ordinary slimes treatment process. The liquid metal in the second kettle, when the crust has been removed from it, is transferred to the third kettle and heated uniformly throughout to a temperature ranging between 800° F. and 900° F. As cooling proceeds the crust is transferred from the third kettle to the second kettle for retreatment with a subsequent charge in the second kettle, and the liquid metal in the third kettle is transferred to the fourth kettle heated uniformly throughout to a temperature ranging from 600° F. to 700° F. The crust of the fourth kettle is transferred to the third kettle and the liquid metal in the fourth kettle is transferred to the fifth kettle heated uniformly throughout to a temperature ranging between 300° F. and 600° F. The crust of the fifth kettle is transferred to the sixth kettle the temperature of which is maintained at about 260° F. to give a low freezing liquid lead bismuth alloy free from other metals and impurities. The application of this procedure finally resolves the original charge into two products; one of which consists of lead bismuth alloy free from impurities and the added zinc, suitable for the recovery of marketable lead by treatment in the electrolytic step already outlined and indicated as step 8, and marketable bismuth by the step previously outlined and indicated as step 9, and the other of which consists chiefly of metals such as gold, silver, arsenic and antimony, and small proportions of lead and bismuth originally associated with the lead-bismuth in the crude charge which is returned to the cycle of operations as above indicated.

The following example indicates the composition of the crusts and liquid metals, and the analytical results secured from representative samples taken at a period when the system of separation was in complete action during the treatment of 88 tons of the crude material containing 109.4 ozs. gold, 16,684 ozs. silver, 59% lead, 28% bismuth, trace arsenic, .25% antimony, with the addition of 2½% zinc.

| Crusts kettle | Gold ozs. per ton | Silver ozs. per ton | Zinc % | Fah. temp. of |
|---|---|---|---|---|
| No. 2 passing to kettle No. 1 | 4.12 | 1,786.6 | 20.0 | 1100–900 |
| 3 " " " " 2 | .54 | 969.6 | 16.0 | 900–800 |
| 4 " " " " 3 | .03 | 617.4 | 15.3 | 700–600 |
| 5 " " " " 4 | Trace | 115.0 | 8.6 | 500–300 |
| liquids kettle | | | | |
| No. 2 passing to kettle No. 3 | .03 | 235.5 | 6.0 | |
| 3 " " " " 4 | .01 | 93.6 | 3.7 | |
| 4 " " " " 5 | Trace | 14.1 | 1.5 | |
| 5 " " " " 6 | Trace | Trace | Nil | |

Having thus fully described our invention what we claim as new and desire to secure by Letters Patent is:

1. A process of refining lead-bismuth alloy containing 20–40% bismuth, which comprises incorporating zinc with a charge of the crude alloy in a fusing vessel, heating it and maintaining the heat at a substantially uniform temperature between 900° F. and 1100° F. throughout the charge, transferring the crust of the molten charge to a separate vessel uniformly heated to a temperature above 1100° F. and the liquid residue of the charge to a succession of separate vessels the temperatures of which are progressively graduated from 900° F. to 260° F., maintaining each vessel at a uniform temperature throughout the charge, transferring the solidifying metals and impurities from each of the lower heated vessels to the next higher heated vessel in succession, transferring the liquid residue from each of the higher heated vessels to the next lower heated vessel in succession for the production, at the lowest heated vessel, of a low freezing lead-bismuth alloy substantially free from the other metals and impurities with which it was associated at the commencement of the operations, electrolyzing the residual lead-bismuth for separation into cathode lead and a bismuth product, and washing, drying and melting in an oxidizing atmosphere said bismuth product.

2. A process of refining lead-bismuth alloy containing 20–40% bismuth, which comprises incorporating from one and one half per cent to three per cent of zinc with a charge of the crude alloy in a fusing vessel, heating it, maintaining the heat at a uniform temperature throughout the charge materially above its fusion point, transferring the crust of the molten charge to a separate vessel uniformly heated to a higher temperature than said fusing vessel and the liquid residue of the charge to a succession of separate vessels, the temperatures of which are progressively graduated from the maximum of the graduated temperatures to the freezing point of the residual lead-bismuth alloy, maintaining each vessel at a uniform temperature throughout the charge, transferring the solidifying metals and impurities from each of the lower heated vessels to the next higher heated vessel in succession and transferring the liquid residue from each of the higher heated vessels to the next lower heated vessel in succession for the production, at the lowest heated vessel, of a low freezing lead-bismuth alloy substantially free from the other metals and impurities with which it was associated at the commencement of the operation, and electrolyzing the residual lead-bismuth for separation into cathode lead and a bismuth product, and washing, drying and melting in an oxidizing atmosphere said bismuth product.

3. A process of refining lead-bismuth alloy containing 20–40% bismuth, which comprises incorporating from one and one half per cent to three per cent of zinc with a charge of the crude alloy in a fusing vessel, heating it, and maintaining the heat at a substantially uniform temperature of between 900° F. and 1100° F. throughout the charge, transferring the crust of the molten charge to a separate vessel uniformly heated to a temperature above 1100° F. and the liquid residue of the charge to a succession of separate vessels the temperatures of which are progressively graduated from 900° F. to 260° F. maintaining each vessel at a uniform temperature throughout the charge, transferring the solidifying metals and impurities from each of the lower heated vessels to the next higher heated vessel in succession, transferring the liquid residue from each of the higher heated vessels to the next lower heated vessel in succession for the production, at the lowest heated vessel, of a low freezing lead-bismuth alloy substantially free from the other metals and impurities with which it was associated at the commencement of the operation, electrolyzing the residual lead-bismuth for separation into cathode lead and a bismuth product, and washing, drying and melting in an oxidizing atmosphere said bismuth product.

4. A process of refining lead bismuth alloy containing 20–40% bismuth by passing the charge through a series of separate thermal stages; which comprises incorporating zinc in a charge of the crude alloy; heating the charge at the initial stage to a temperature ranging between 900° F. and 1100° F.; removing the solidifying metals and impurities from the molten charge at the initial stage and transferring them to the crust melting stage and there heating them to a higher temperature than that of the initial stage; removing the liquid residue from the initial stage and passing it through a succession of separate thermal stages of progressively descending temperatures graduated from 900° F. to 260° F.; maintaining a uniform temperature throughout the charge at each stage; removing the solidifying metals and impurities at each stage and transferring them to the next higher heated stage of the series for the recovery of all the contained metals except the lead and bismuth; removing the liquid residue at each stage and transferring it to the next lower heated stage of the series for the production at the lowest thermal stage of a low freezing lead bismuth alloy substantially free from the other metals and impurities with which it was associated at the commencement of the operation, electrolyzing the residual lead-bismuth for separation into cathode lead and a bismuth product, and washing, drying and melting in an oxidizing atmosphere the said bismuth product.

5. A process of refining lead-bismuth alloy containing 20–40% bismuth which comprises incorporating zinc in a charge of the crude alloy, passing the charge through a series of separate thermal stages of progressively descending temperatures graduated from 1100° F. to 260° F.; maintaining at each stage a uniform temperature throughout the charge, passing the solidifying metals and impurities from each stage to the next higher stage of the series and the residual liquid from each stage to the next lower stage of the series; recovering, at the final stage at one end of the operation, a low freezing lead-bismuth alloy substantially free from the other metals and impurities with which it was associated at the commencement of the operation, and, at the final stage at the other end of the operation a crust containing said other metals and impurities, electrolyzing the residual lead bismuth for separation into cathode lead and a bismuth product, and washing, drying and melting in an oxidizing atmosphere said bismuth product.

6. A process for the treatment of slimes incident to the electrolytic refining of lead which consists in melting the slimes; submitting the resultant metal to an oxidizing treatment for the elimination of impurities as fume; submitting the residual metal to a series of coolings accompanied with the separation of such crusts formed as embody the major proportion of the contained gold, silver, and copper together with some lead and bismuth; remelting these crusts and submitting them in a molten condition to an oxidizing treatment for the separation of the contained copper, lead and bismuth as oxide slags; reducing these oxide slags to metal by heating with carbonaceous materials and returning the metal so produced to the preceding sequence of cooling and crust formation steps together with the initial metal introduced to that step from which, in addition to the crusts so recovered, a residual low freezing point liquid lead bismuth alloy is obtained; the addition of zinc, and any metal of analogous composition from any source, to this product, and the mixture again submitted to a series of cooling and crust formation treatments yielding secondary crusts returnable to the early stages of the sequence with or without a special treatment for the elimination and recovery of the contained zinc and a low freezing point lead bismuth alloy substantially free from all impurities; electrolyzing the resulting lead bismuth alloy for separation into cathode lead and a bismuth product; washing and drying the bismuth product and melting it in an oxidizing atmosphere.

7. A process for the treatment of slimes incident to the electrolytic refining of lead which consists in melting the slimes; submitting the resultant metal to an oxidizing treatment for the elimination of impurities as fume; submitting the residual metal to a series of coolings accompanied by the separation of such crusts as embody the major proportion of the contained gold, silver and copper together with some lead and bismuth; remelting these crusts and submitting them in a molten condition to an oxidizing treatment for the separation of the contained copper, lead and bismuth from the silver and gold as oxide slags; reducing these oxide slags to metal by heating with carbonaceous materials and treating the metal so produced to a series of cooling and crusts separation treatments, whereby crusts containing gold, silver and copper together with any other impurities and some lead and bismuth, are returned for gold and silver recovery, and a residual low freezing point lead bismuth alloy is obtained; the addition of zinc, and any metal of analogous composition from any source, to this product, and the mixture again submitted to a series of cooling and crust formation treatments yielding crusts returnable to the early stages of the sequence with or without a special treatment for the elimination and recovery of the contained zinc, and a low freezing point lead bismuth alloy substantially free from all impurities; electrolyzing the resulting lead bismuth alloy for separation into cathode lead and a bismuth product; washing and drying the bismuth product and melting it in an oxidizing atmosphere.

JOHN JAMES FINGLAND.
ALEXANDER DOUGLAS TURNBULL.
PETER FINDLAY McINTYRE.